US012249276B2

United States Patent
(12) United States Patent
Ryu et al.

(10) Patent No.: US 12,249,276 B2
(45) Date of Patent: Mar. 11, 2025

(54) DISPLAY DEVICE AND OPERATING METHOD THEREOF

(71) Applicant: LG ELECTRONICS INC., Seoul (KR)

(72) Inventors: Byung Woo Ryu, Seoul (KR); Joon Duk Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/190,203

(22) Filed: Mar. 27, 2023

(65) Prior Publication Data

US 2024/0105116 A1 Mar. 28, 2024

(30) Foreign Application Priority Data

Sep. 26, 2022 (KR) ........................ 10-2022-0121341

(51) Int. Cl.
*G09G 3/3225* (2016.01)

(52) U.S. Cl.
CPC ..... *G09G 3/3225* (2013.01); *G09G 2310/061* (2013.01); *G09G 2310/08* (2013.01); *G09G 2320/045* (2013.01); *G09G 2330/021* (2013.01); *G09G 2360/12* (2013.01); *G09G 2360/16* (2013.01)

(58) Field of Classification Search
CPC ........... G09G 3/3225; G09G 2310/061; G09G 2310/08; G09G 2320/045; G09G 2330/021; G09G 2360/12; G09G 2360/16; G09G 3/20; G09G 3/3233; G09G 2320/0276; G09G 2320/0673; G09G 2370/04; G09G 5/10; G09G 3/3208; G09G 2320/0626
See application file for complete search history.

(56) References Cited

U.S. PATENT DOCUMENTS

2010/0141667 A1* 6/2010 Chiou .................. G09G 3/3233 345/76
2014/0152721 A1* 6/2014 Byun ................... G09G 3/3208 345/82

(Continued)

FOREIGN PATENT DOCUMENTS

KR 10-2006-0066760 6/2006
KR 10-2015-0026374 3/2015

(Continued)

OTHER PUBLICATIONS

European Patent Office Application Serial No. 23162063, Search Report dated Aug. 31, 2023, 4 pages.

(Continued)

*Primary Examiner* — Grant Sitta
(74) *Attorney, Agent, or Firm* — LEE, HONG, DEGERMAN, KANG & WAIMEY

(57) ABSTRACT

A display device prevents an increase in chip size and cost by calculating an APL value without a frame memory connected to a timing controller and includes a display panel, a timing controller configured to control an operation of the display panel, a memory configured to store image data of an image frame, and a processor configured to calculate an average picture level (APL) value using the image data stored in the memory, and transfer the calculated APL value to the timing controller.

12 Claims, 11 Drawing Sheets

180

(56) References Cited

U.S. PATENT DOCUMENTS

| | | | | |
|---|---|---|---|---|
| 2015/0062186 | A1* | 3/2015 | Park | G09G 3/3233 345/87 |
| 2015/0170560 | A1* | 6/2015 | Lim | G09G 3/3291 345/691 |
| 2015/0242704 | A1* | 8/2015 | Nobori | G09G 5/003 345/589 |
| 2017/0193877 | A1* | 7/2017 | Lee | G09G 3/3291 |
| 2020/0365096 | A1 | 11/2020 | Xiao | |

FOREIGN PATENT DOCUMENTS

| | | |
|---|---|---|
| KR | 10-2017-0031941 | 3/2017 |
| KR | 10-2018-0059652 | 6/2018 |
| KR | 10-2021-0031515 | 3/2021 |
| KR | 102387346 | 4/2022 |

OTHER PUBLICATIONS

Korean Intellectual Property Office Application No. 10-2022-0121341, Office Action dated Nov. 24, 2023, 2 pages.
Korean Intellectual Property Office Application No. 10-2022-0121341, Office Action dated Sep. 11, 2024, 10 pages.

* cited by examiner

DISPLAY DEVICE AND OPERATING METHOD THEREOF

CROSS-REFERENCE TO RELATED APPLICATION

Pursuant to 35 U.S.C. § 119(a), this application claims the benefit of earlier filing date and right of priority to Korean Patent Application No. 10-2022-0121341, filed on Sep. 26, 2022, the contents of which are all hereby incorporated by reference herein in its entirety.

BACKGROUND OF THE INVENTION

1. Field of the Invention

The present disclosure relates to a display device, and more particularly, to an organic light emitting diode display device.

2. Discussion of the Related Art

Recently, types of display devices have been diversified. Among them, an organic light emitting diode display device (hereinafter referred to as an "OLED display device") is widely used.

An OLED display device is a display device using an organic light emitting element. Since the organic light emitting device is a self-light-emitting device, the OLED display device has advantages of having lower power consumption and manufactured to be thinner than a liquid crystal display device requiring a backlight. In addition, the OLED display device has a wide viewing angle and a fast response speed.

In the case of a timing controller (T-Con) provided in a conventional OLED display device, the luminance of the display panel is determined by calculating an average peak luminance (APL) of an input image.

Then, the timing controller limits the maximum current by calculating current consumed by the display panel according to the determined luminance.

In this case, in order to determine the luminance and current of an actual display panel after calculating the APL of the input image and the current consumed by the display panel, an external memory in the form of a frame memory for storing and processing one frame data is required, and thus there is a problem of increasing the size of chip.

In addition, as the resolution of the display panel increases, the data processing speed and capacity of the frame memory become 4 times compared to 4K in order to realize resolution of 8K, and thus there is a problem that implementation and hardware blocks are complicated through one chip.

SUMMARY OF THE INVENTION

An object of the present disclosure is to prevent an increase in chip size and cost by calculating an APL value without a frame memory connected to a timing controller.

An object of the present disclosure is to transfer an APL value to a timing controller without an additional interface.

A display device according to an embodiment of the present disclosure may include a display panel, a timing controller configured to control an operation of the display panel, a memory configured to store image data of an image frame, and a processor configured to calculate an average picture level (APL) value using the image data stored in the memory, and transfer the calculated APL value to the timing controller.

The processor may calculate luminance of the display panel using the calculated APL value and may transfer the APL value and the calculated luminance to the timing controller.

The processor may insert the APL value in a blank period present between an active period of the image frame and an active period of a previous image frame and may transfer the APL value to the timing controller.

DETAILED DESCRIPTION OF THE PREFERRED EMBODIMENTS

Hereinafter, the present disclosure will be described in more detail with reference to the drawings.

Figure 1:
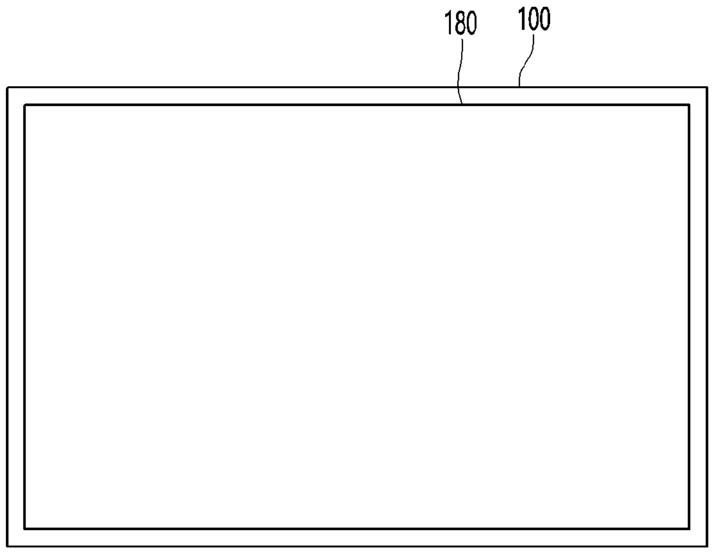
FIG. 1 is a diagram illustrating a display device according to an embodiment of the present disclosure.

FIG. 1 is a diagram illustrating a display device according to an embodiment of the present disclosure.

Referring to the drawings, a display device 100 may include a display unit 180.

Meanwhile, the display unit 180 may be implemented with any one of various panels. For example, the display unit 180 may be any one of a liquid crystal display panel (LCD panel), an organic light emitting diode panel (OLED panel), and an inorganic light emitting diode panel (LED panel).

In the present disclosure, it is assumed that the display unit 180 includes an organic light emitting diode panel (OLED panel). It should be noted that this is only exemplary, and the display unit 180 may include a panel other than an organic light emitting diode panel (OLED panel).

Meanwhile, the display device 100 of FIG. 1 may be a monitor, a TV, a tablet PC, or a mobile terminal.

Figure 2:
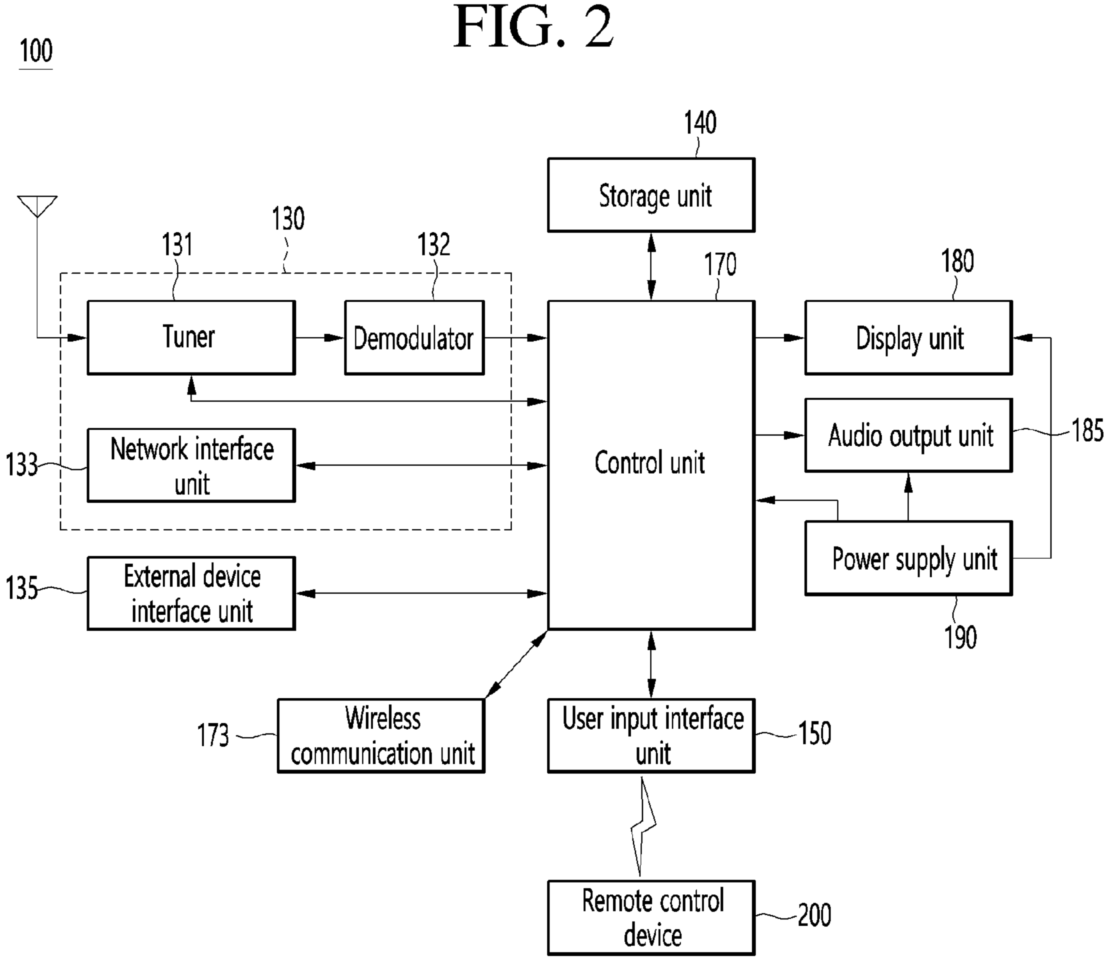
FIG. 2 is a block diagram illustrating a configuration of the display device of FIG. 1.

FIG. 2 is a block diagram showing a configuration of the display device of FIG. 1.

Referring to FIG. 2, the display device 100 may include a broadcast receiving unit 130, an external device interface unit 135, a storage unit 140, a user input interface unit 150, a control unit 170, and a wireless communication unit 173, a display unit 180, an audio output unit 185, and a power supply unit 190.

The broadcast receiving unit 130 may include a tuner 131, a demodulator 132, and a network interface unit 133.

The tuner 131 may select a specific broadcast channel according to a channel selection command. The tuner 131 may receive a broadcast signal for the selected specific broadcast channel.

The demodulator 132 may separate the received broadcast signal into a video signal, an audio signal, and a data signal related to a broadcast program, and restore the separated video signal, audio signal, and data signal to a format capable of being output.

The network interface unit 133 may provide an interface for connecting the display device 100 to a wired/wireless network including an Internet network. The network interface unit 133 may transmit or receive data to or from other users or other electronic devices through a connected network or another network linked to the connected network.

The network interface unit 133 may access a predetermined web page through the connected network or the other network linked to the connected network. That is, it is possible to access a predetermined web page through a network, and transmit or receive data to or from a corresponding server.

In addition, the network interface unit 133 may receive content or data provided by a content provider or a network operator. That is, the network interface unit 133 may receive content such as a movie, advertisement, game, VOD, broadcast signal, and related information provided by a content provider or a network provider through a network.

In addition, the network interface unit 133 may receive update information and update files of firmware provided by the network operator, and may transmit data to an Internet or content provider or a network operator.

The network interface unit 133 may select and receive a desired application from among applications that are open to the public through a network.

The external device interface unit 135 may receive an application or a list of applications in an external device adjacent thereto, and transmit the same to the control unit 170 or the storage unit 140.

The external device interface unit 135 may provide a connection path between the display device 100 and the external device. The external device interface unit 135 may receive one or more of video and audio output from an external device wirelessly or wired to the display device 100 and transmit the same to the control unit 170. The external device interface unit 135 may include a plurality of external input terminals. The plurality of external input terminals may include an RGB terminal, one or more High Definition Multimedia Interface (HDMI) terminals, and a component terminal.

The video signal of the external device input through the external device interface unit 135 may be output through the display unit 180. The audio signal of the external device input through the external device interface unit 135 may be output through the audio output unit 185.

The external device connectable to the external device interface unit 135 may be any one of a set-top box, a Blu-ray player, a DVD player, a game machine, a sound bar, a smartphone, a PC, a USB memory, and a home theater, but this is only an example.

In addition, a part of content data stored in the display device 100 may be transmitted to a selected user among a selected user or a selected electronic device among other users or other electronic devices registered in advance in the display device 100.

The storage unit 140 may store programs for signal processing and control of the control unit 170, and may store video, audio, or data signals, which have been subjected to signal-processed.

In addition, the storage unit 140 may perform a function for temporarily storing video, audio, or data signals input from an external device interface unit 135 or the network interface unit 133, and store information on a predetermined video through a channel storage function.

The storage unit 140 may store an application or a list of applications input from the external device interface unit 135 or the network interface unit 133.

The display device 100 may play back a content file (a moving image file, a still image file, a music file, a document file, an application file, or the like) stored in the storage unit 140 and provide the same to the user.

The user input interface unit 150 may transmit a signal input by the user to the control unit 170 or a signal from the control unit 170 to the user. For example, the user input interface unit 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the control unit 170 to the remote control device 200.

In addition, the user input interface unit 150 may transmit a control signal input from a local key (not shown) such as a power key, a channel key, a volume key, and a setting value to the control unit 170.

The video signal image-processed by the control unit 170 may be input to the display unit 180 and displayed with video corresponding to a corresponding video signal. Also, the video signal image-processed by the control unit 170 may be input to an external output device through the external device interface unit 135.

The audio signal processed by the control unit 170 may be output to the audio output unit 185. Also, the audio signal processed by the control unit 170 may be input to the external output device through the external device interface unit 135.

In addition, the control unit 170 may control the overall operation of the display device 100.

In addition, the control unit 170 may control the display device 100 by a user command input through the user input interface unit 150 or an internal program and connect to a network to download an application a list of applications or applications desired by the user to the display device 100.

The control unit 170 may allow the channel information or the like selected by the user to be output through the display unit 180 or the audio output unit 185 along with the processed video or audio signal.

In addition, the control unit 170 may output a video signal or an audio signal through the display unit 180 or the audio output unit 185, according to a command for playing back a video of an external device through the user input interface unit 150, the video signal or the audio signal being input from an external device, for example, a camera or a camcorder, through the external device interface unit 135.

Meanwhile, the control unit 170 may allow the display unit 180 to display a video, for example, allow a broadcast video which is input through the tuner 131 or an external input video which is input through the external device interface unit 135, a video which is input through the network interface unit or a video which is stored in the storage unit 140 to be displayed on the display unit 180. In this case, the video displayed on the display unit 180 may be a still image or a moving image, and may be a 2D image or a 3D image.

In addition, the control unit 170 may allow content stored in the display device 100, received broadcast content, or external input content input from the outside to be played back, and the content may have various forms such as a broadcast video, an external input video, an audio file, still images, accessed web screens, and document files.

The wireless communication unit 173 may communicate with an external device through wired or wireless communication. The wireless communication unit 173 may perform short range communication with an external device. To this end, the wireless communication unit 173 may support short range communication using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication unit 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication unit 173 may detect (or recognize) a wearable device capable of communication around the display device 100. Furthermore, when the detected wearable device is an authenticated device to communicate with the display device 100 according to the present disclosure, the control unit 170 may transmit at least a portion of data processed by the display device 100 to the wearable device through the wireless communication unit 173. Therefore, a user of the wearable device may use data processed by the display device 100 through the wearable device.

The display unit 180 may convert a video signals, data signal, or OSD signal processed by the control unit 170, or a video signal or data signal received from the external device interface unit 135 into R, G, and B signals, and generate drive signals.

Meanwhile, the display device 100 illustrated in FIG. 2 is only an embodiment of the present disclosure, and therefore, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 2, the display device 100 may receive a video through the network interface unit 133 or the external device interface unit 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 2 and but also one of an image processing device such as the separated set-top box and a content playback device including the display unit 180 the audio output unit 185.

The audio output unit 185 may receive a signal audio-processed by the control unit 170 and output the same with audio.

The power supply unit 190 may supply corresponding power to the display device 100. Particularly, power may be supplied to the control unit 170 that may be implemented in the form of a system on chip (SOC), the display unit 180 for video display, and the audio output unit 185 for audio output.

Specifically, the power supply unit 190 may include a converter that converts AC power into DC power, and a dc/dc converter that converts a level of DC power.

The remote control device 200 may transmit a user input to the user input interface unit 150. To this end, the remote control device 200 may use Bluetooth, Radio Frequency (RF) communication, Infrared (IR) communication, Ultra Wideband (UWB), ZigBee, or the like. In addition, the remote control device 200 may receive a video, audio, or data signal or the like output from the user input interface unit 150, and display or output the same through the remote control device 200 by video or audio.

Figure 3:
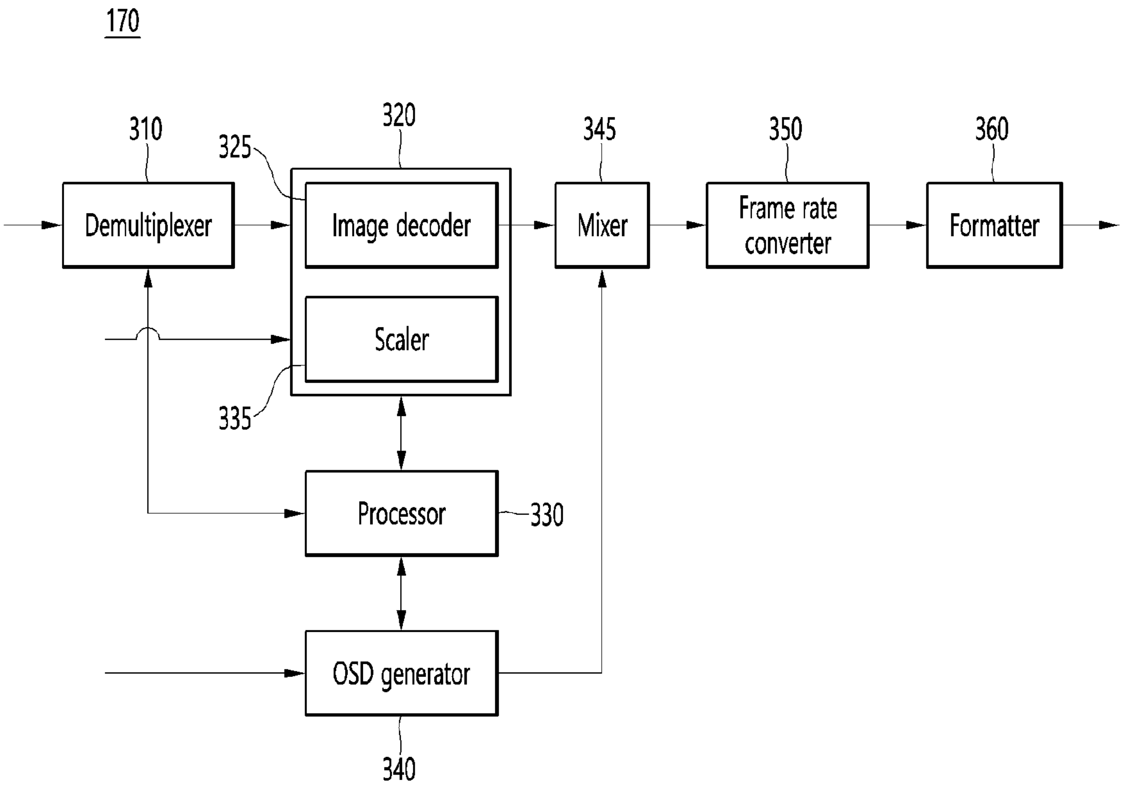
FIG. 3 is an example of an internal block diagram of a control unit of FIG. 2.

FIG. 3 is an example of an internal block diagram of the controller of FIG. 2.

Referring to the drawings, the control unit 170 according to an embodiment of the present disclosure may include a demultiplexer 310, an image processing unit 320, a processor 330, an OSD generator 340, a mixer 345, a frame rate converter 350, and a formatter 360. In addition, an audio processing unit (not shown) and a data processing unit (not shown) may be further included.

The demultiplexer 310 may demultiplex input stream. For example, when MPEG-2 TS is input, the demultiplexer 310 may demultiplex the MPEG-2 TS to separate the MPEG-2 TS into video, audio, and data signals. Here, the stream signal input to the demultiplexer 310 may be a stream signal output from the tuner 131, the demodulator 132 or the external device interface unit 135.

The image processing unit 320 may perform image processing on the demultiplexed video signal. To this end, the image processing unit 320 may include an image decoder 325 and a scaler 335.

The image decoder 325 may decode the demultiplexed video signal, and the scaler 335 may scale a resolution of the decoded video signal to be output through the display unit 180.

The video decoder 325 may be provided with decoders of various standards. For example, an MPEG-2, H.264 decoder, a 3D video decoder for color images and depth images, and a decoder for multi-view images may be provided.

The processor 330 may control the overall operation of the display device 100 or of the control unit 170. For example, the processor 330 may control the tuner 131 to select (tune) an RF broadcast corresponding to a channel selected by a user or a pre-stored channel.

In addition, the processor 330 may control the display device 100 by a user command input through the user input interface unit 150 or an internal program.

In addition, the processor 330 may perform data transmission control with the network interface unit 135 or the external device interface unit 135.

In addition, the processor 330 may control operations of the demultiplexer 310, the image processing unit 320, and the OSD generator 340 in the control unit 170.

The OSD generator 340 may generate an OSD signal according to a user input or by itself. For example, based on a user input signal, a signal for displaying various information on a screen of the display unit 180 as a graphic or text may be generated. The generated OSD signal may include various data such as a user interface screen, various menu screens, widgets, and icons of the display device 100. In addition, the generated OSD signal may include a 2D object or a 3D object.

In addition, the OSD generator 340 may generate a pointer that may be displayed on the display unit 180 based on a pointing signal input from the remote control device 200. In particular, such a pointer may be generated by the pointing signal processing unit, and the OSD generator 340 may include such a pointing signal processing unit (not shown). Of course, the pointing signal processing unit (not shown) may be provided separately, not be provided in the OSD generator 340

The mixer 345 may mix the OSD signal generated by the OSD generator 340 and the decoded video signal image-processed by the image processing unit 320. The mixed video signal may be provided to the frame rate converter 350.

The frame rate converter (FRC) 350 may convert a frame rate of an input video. On the other hand, the frame rate converter 350 may output the input video as it is, without a separate frame rate conversion.

On the other hand, the formatter 360 may change the format of the input video signal into a video signal to be displayed on the display and output the same.

The formatter 360 may change the format of the video signal. For example, it is possible to change the format of the 3D video signal to any one of various 3D formats such as a side by side format, a top/down format, a frame sequential format, an interlaced format, a checker box and the like.

Meanwhile, the audio processing unit (not shown) in the control unit 170 may perform audio processing of a demultiplexed audio signal. To this end, the audio processing unit (not shown) may include various decoders.

In addition, the audio processing unit (not shown) in the control unit 170 may process a base, treble, volume control, and the like.

The data processing unit (not shown) in the control unit 170 may perform data processing of the demultiplexed data signal. For example, when the demultiplexed data signal is an encoded data signal, the demultiplexed data signal may be decoded. The coded data signal may be electronic program guide information including broadcast information such as a start time and an end time of a broadcast program broadcast on each channel.

Meanwhile, a block diagram of the control unit 170 illustrated in FIG. 3 is a block diagram for an embodiment of the present disclosure. The components of the block diagram may be integrated, added, or omitted depending on the specification of the control unit 170 that is actually implemented.

In particular, the frame rate converter 350 and the formatter 360 may not be provided in the control unit 170, and may be separately provided or separately provided as a single module.

Figure 4A:
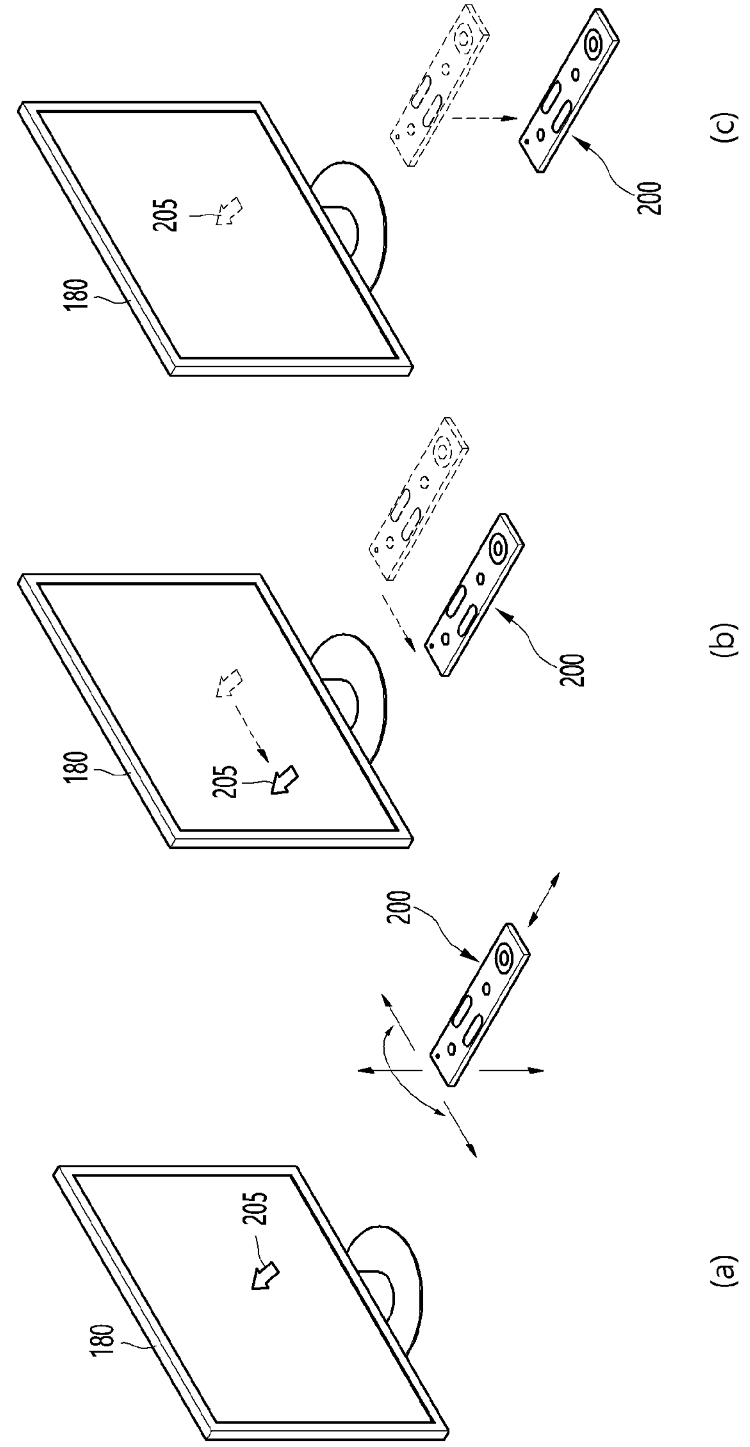
FIG. 4A is a diagram illustrating a control method for a remote control device of FIG. 2.

FIG. 4A is a diagram illustrating a control method for a remote control device of FIG. 2.

In (a) of FIG. 4A, it is illustrated that a pointer 205 corresponding to the remote control device 200 is displayed on the display unit 180.

The user may move or rotate the remote control device 200 up and down, left and right (FIG. 4A (b)), and forward and backward ((c) of FIG. 4A). The pointer 205 displayed on the display unit 180 of the display device may correspond to the movement of the remote control device 200. The remote control device 200 may be referred to as a spatial remote controller or a 3D pointing device, as the corresponding pointer 205 is moved and displayed according to the movement on a 3D space, as shown in the drawing.

In (b) of FIG. 4A, it is illustrated that that when the user moves the remote control device 200 to the left, the pointer 205 displayed on the display unit 180 of the display device moves to the left correspondingly.

Information on the movement of the remote control device 200 detected through a sensor of the remote control device 200 is transmitted to the display device. The display device may calculate the coordinates of the pointer 205 based on information on the movement of the remote control device 200. The display device may display the pointer 205 to correspond to the calculated coordinates.

In (c) of FIG. 4A, it is illustrated that a user moves the remote control device 200 away from the display unit 180 while pressing a specific button in the remote control device 200. Accordingly, a selected region in the display unit 180 corresponding to the pointer 205 may be zoomed in and displayed to be enlarged. Conversely, when the user moves the remote control device 200 close to the display unit 180, the selected region in the display unit 180 corresponding to the pointer 205 may be zoomed out and displayed to be reduced. On the other hand, when the remote control device 200 moves away from the display unit 180, the selected region may be zoomed out, and when the remote control device 200 moves close to the display unit 180, the selected region may be zoomed in.

Meanwhile, in a state in which a specific button in the remote control device 200 is being pressed, recognition of up, down, left, or right movements may be excluded. That is, when the remote control device 200 moves away from or close to the display unit 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Figure 4B:
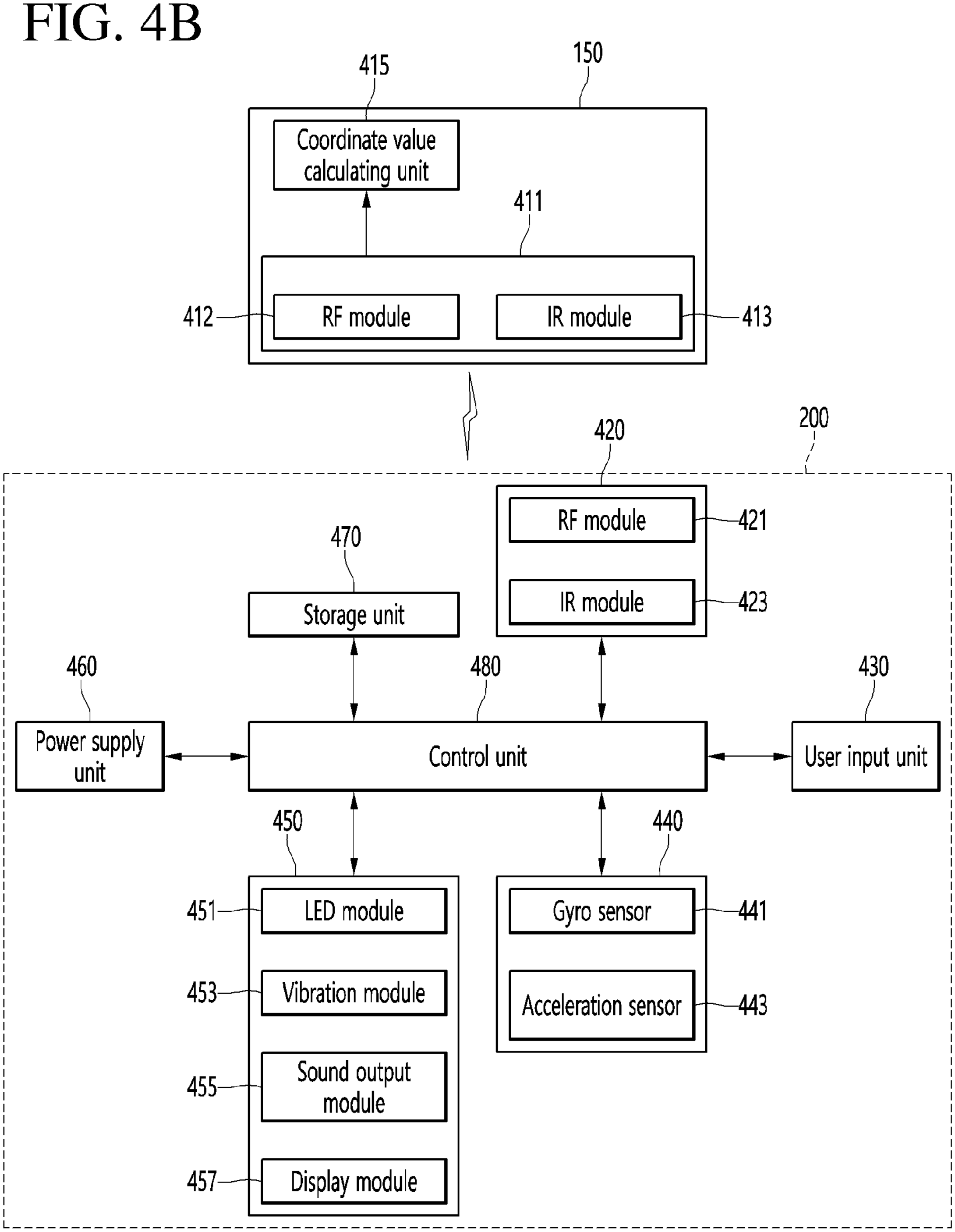
FIG. 4B is an internal block diagram of the remote control device of FIG. 2.

FIG. 4B is an internal block diagram of the remote control device of FIG. 2.

Referring to the drawing, the remote control device 200 may include a wireless communication unit 420, a user input unit 430, a sensor unit 440, an output unit 450, a power supply unit 460, a storage unit 470, ad a control unit 480.

The wireless communication unit 420 may transmit and receive signals to and from any one of the display devices according to the embodiments of the present disclosure described above. Among the display devices according to embodiments of the present disclosure, one display device 100 will be described as an example.

In the present embodiment, the remote control device 200 may include an RF module 421 capable of transmitting and receiving signals to and from the display device 100 according to the RF communication standard. In addition, the remote control device 200 may include an IR module 423 capable of transmitting and receiving signals to and from the display device 100 according to the IR communication standard.

In the present embodiment, the remote control device 200 transmits a signal containing information on the movement of the remote control device 200 to the display device 100 through the RF module 421.

Also, the remote control device 200 may receive a signal transmitted by the display device 100 through the RF module 421. In addition, the remote control device 200 may transmit a command regarding power on/off, channel change, volume adjustment, or the like to the display device 100 through the IR module 423 as necessary.

The user input unit 430 may include a keypad, a button, a touch pad, or a touch screen. The user may input a command related to the display device 100 to the remote control device 200 by operating the user input unit 430. When the user input unit 430 includes a hard key button, the user may input a command related to the display device 100 to the remote control device 200 through a push operation of the hard key button. When the user input unit 430 includes a touch screen, the user may input a command related to the display device 100 to the remote control device 200 by touching a soft key of the touch screen. In addition, the user input unit 430 may include various types of input means that may be operated by a user, such as a scroll key or a jog key, and the present embodiment does not limit the scope of the present disclosure.

The sensor unit 440 may include a gyro sensor 441 or an acceleration sensor 443. The gyro sensor 441 may sense information on the movement of the remote control device 200.

For example, the gyro sensor 441 may sense information on the operation of the remote control device 200 based on the x, y, and z axes. The acceleration sensor 443 may sense information on the movement speed of the remote control device 200 and the like. Meanwhile, a distance measurement sensor may be further provided, whereby a distance to the display unit 180 may be sensed.

The output unit 450 may output a video or audio signal corresponding to the operation of the user input unit 430 or a signal transmitted from the display device 100. The user may recognize whether the user input unit 430 is operated or whether the display device 100 is controlled through the output unit 450.

For example, the output unit 450 may include an LED module 451 that emits light, a vibration module 453 that generates vibration, a sound output module 455 that outputs sound, or a display module 457 that outputs a video when the user input unit 430 is operated or a signal is transmitted and received through the wireless communication unit 420.

The power supply unit 460 supplies power to the remote control device 200. The power supply unit 460 may reduce power consumption by stopping power supply when the remote control device 200 has not moved for a predetermined time. The power supply unit 460 may restart power supply when a predetermined key provided in the remote control device 200 is operated.

The storage unit 470 may store various types of programs and application data required for control or operation of the remote control device 200. When the remote control device 200 transmits and receives signals wirelessly through the display device 100 and the RF module 421, the remote control device 200 and the display device 100 transmit and receive signals through a predetermined frequency band. The control unit 480 of the remote control device 200 may store and refer to information on a frequency band capable of wirelessly transmitting and receiving signals to and from the display device 100 paired with the remote control device 200 in the storage unit 470.

The control unit 480 may control all matters related to the control of the remote control device 200. The control unit 480 may transmit a signal corresponding to a predetermined key operation of the user input unit 430 or a signal corresponding to the movement of the remote control device 200 sensed by the sensor unit 440 through the wireless communication unit 420.

The user input interface unit 150 of the display device 100 may include a wireless communication unit 411 capable of wirelessly transmitting and receiving signals to and from the remote control device 200, and a coordinate value calculating unit 415 capable of calculating coordinate values of a pointer corresponding to the operation of the remote control device 200.

The user input interface unit 150 may transmit and receive signals wirelessly to and from the remote control device 200 through the RF module 412. In addition, signals transmitted by the remote control device 200 according to the IR communication standard may be received through the IR module 413.

The coordinate value calculating unit 415 may correct a hand shake or an error based on a signal corresponding to the operation of the remote control device 200 received through the wireless communication unit 411, and calculate the coordinate values (x, y) of the pointer 205 to be displayed on the display unit 180.

The transmission signal of the remote control device 200 input to the display device 100 through the user input interface unit 150 may be transmitted to the control unit 170 of the display device 100. The control unit 170 may determine information on the operation and key operation of the remote control device 200 based on the signal transmitted by the remote control device 200, and control the display device 100 in response thereto.

As another example, the remote control device 200 may calculate pointer coordinate values corresponding to the operation and output the same to the user input interface unit 150 of the display device 100. In this case, the user input interface unit 150 of the display device 100 may transmit information on the received pointer coordinate values to the control unit 170 without a separate process of correcting a hand shake or error.

In addition, as another example, the coordinate value calculating unit 415 may be provided in the control unit 170 instead of the user input interface unit 150 unlike the drawing.

Figure 5:
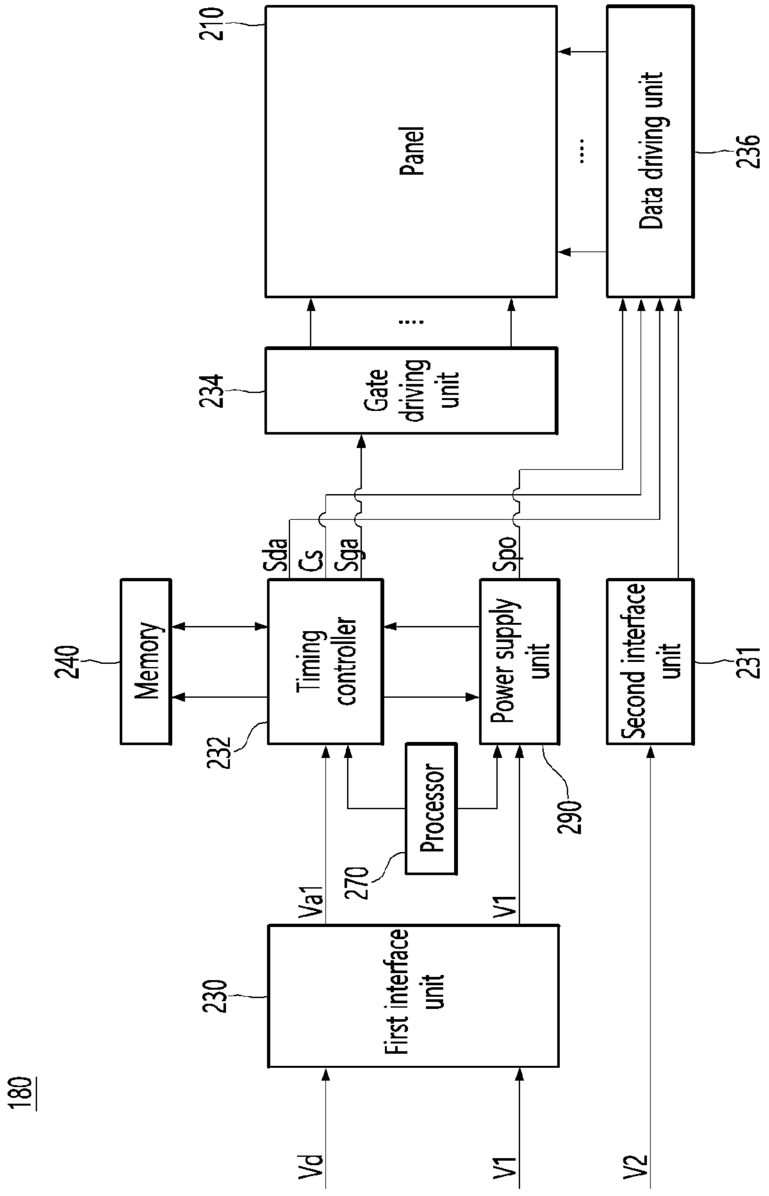
FIG. 5 is an internal block diagram of a display unit of FIG. 2.

FIG. 5 is an internal block diagram of the display unit of FIG. 2.

Referring to the drawing, the display unit 180 based on an organic light emitting panel may include a panel 210, a first interface unit 230, a second interface unit 231, a timing controller 232, a gate driving unit 234, a data driving unit 236, a memory 240, a processor 270, a power supply unit 290, and the like.

The display unit 180 may receive a video signal Vd, first DC power V1, and second DC power V2, and display a predetermined video based on the video signal Vd.

Meanwhile, the first interface unit 230 in the display unit 180 may receive the video signal Vd and the first DC power V1 from the control unit 170.

Here, the first DC power supply V1 may be used for the operation of the power supply unit 290 and the timing controller 232 in the display unit 180.

Next, the second interface unit 231 may receive the second DC power V2 from the external power supply unit 190. Meanwhile, the second DC power V2 may be input to the data driving unit 236 in the display unit 180.

The timing controller 232 may output a data driving signal Sda and a gate driving signal Sga based on the video signal Vd.

For example, when the first interface unit 230 converts the input video signal Vd and outputs the converted video signal val, the timing controller 232 may output the data driving signal Sda and the gate driving signal Sga based on the converted video signal val.

The timing controller 232 may further receive a control signal, a vertical synchronization signal Vsync, and the like, in addition to the video signal Vd from the control unit 170.

In addition, the timing controller 232 may output the gate driving signal Sga for the operation of the gate driving unit 234 and the data driving signal Sda for operation of the data driving unit 236 based on a control signal, the vertical synchronization signal Vsync, and the like, in addition to the video signal Vd.

In this case, the data driving signal Sda may be a data driving signal for driving of RGBW subpixels when the panel 210 includes the RGBW subpixels.

Meanwhile, the timing controller 232 may further output the control signal Cs to the gate driving unit 234.

The gate driving unit 234 and the data driving unit 236 may supply a scan signal and the video signal to the panel 210 through a gate line GL and a data line DL, respectively, according to the gate driving signal Sga and the data driving signal Sda from the timing controller 232. Accordingly, the panel 210 may display a predetermined video.

Meanwhile, the panel 210 may include an organic light emitting layer and may be arranged such that a plurality of gate lines GL intersect a plurality of data lines DL in a matrix form in each pixel corresponding to the organic light emitting layer to display a video.

Meanwhile, the data driving unit 236 may output a data signal to the panel 210 based on the second DC power supply V2 from the second interface unit 231.

The power supply unit 290 may supply various levels of power to the gate driving unit 234, the data driving unit 236, the timing controller 232, and the like.

The processor 270 may perform various control of the display unit 180. For example, the gate driving unit 234, the data driving unit 236, the timing controller 232 or the like may be controlled.

Figure 6A:
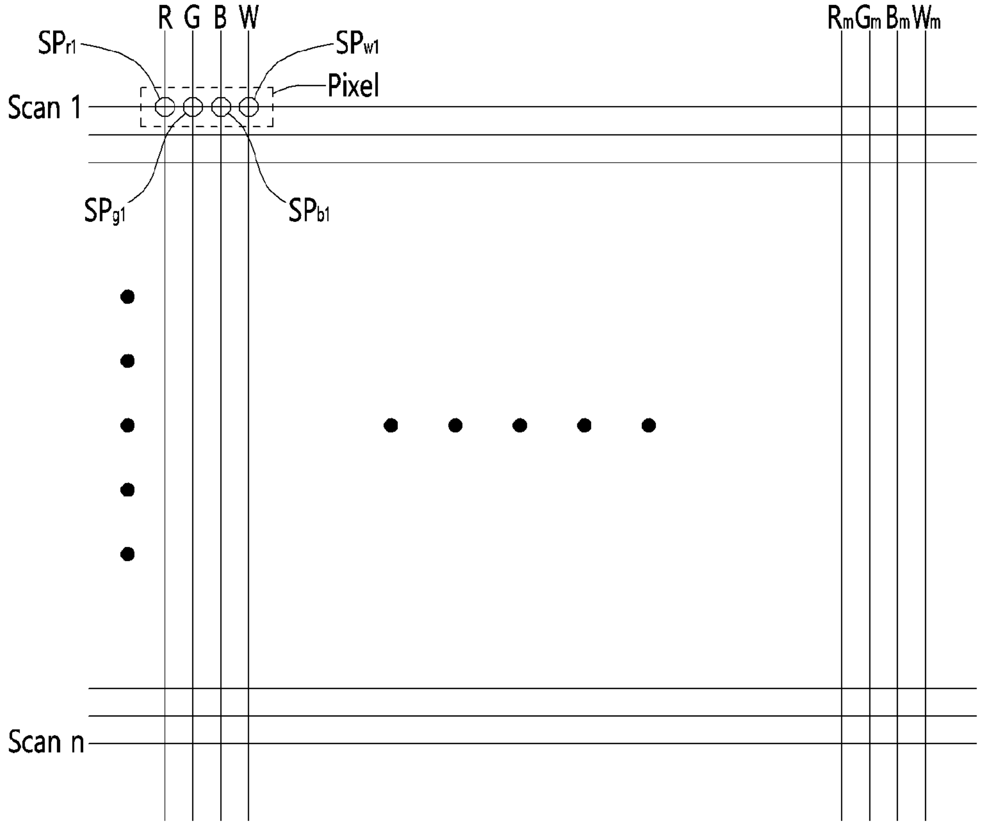
FIGS. 6A to 6B are views referred to for description of an organic light emitting panel of FIG. 5.
Figure 6B:
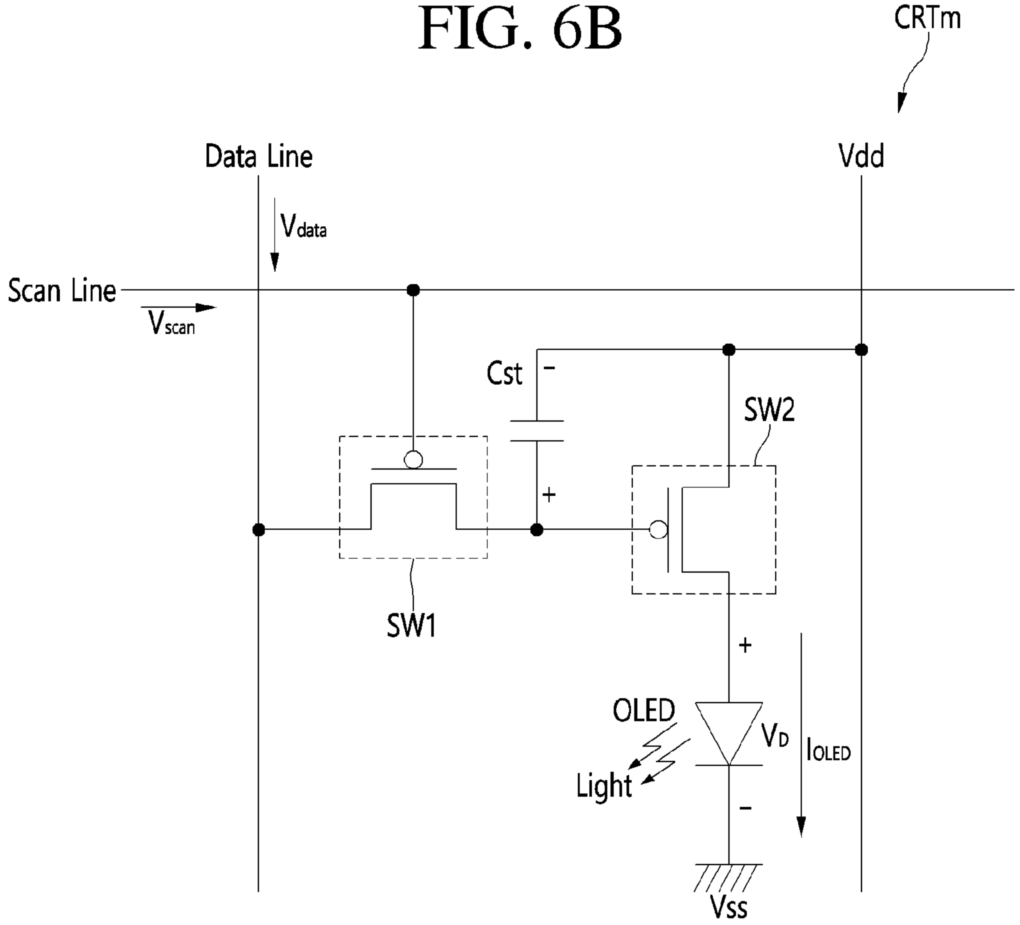

FIGS. 6A to 6B are views referred to for description of the organic light emitting panel of FIG. 5.

First, FIG. 6A is a diagram showing a pixel in the panel 210. The panel 210 may be an organic light emitting panel.

Referring to the drawing, the panel 210 may include a plurality of scan lines (Scan 1 to Scan n) and a plurality of data lines (R1, G1, B1, W1 to Rm, Gm, Bm and Wm) intersecting the scan lines.

Meanwhile, a pixel is defined at an intersection region of the scan lines and the data lines in the panel 210. In the drawing, a pixel having RGBW sub-pixels SPr1, SPg1, SPb1, and SPw1 is shown.

In FIG. 6A, although it is illustrated that the RGBW sub-pixels are provided in one pixel, RGB subpixels may be provided in one pixel. That is, it is not limited to the element arrangement method of a pixel.

FIG. 6B illustrates a circuit of a sub pixel in a pixel of the organic light emitting panel of FIG. 6A.

Referring to the drawing, an organic light emitting sub-pixel circuit CRTm may include a scan switching element SW1, a storage capacitor Cst, a driving switching element SW2, and an organic light emitting layer OLED, as active elements.

The scan switching element SW1 may be connected to a scan line at a gate terminal and may be turned on according to a scan signal Vscan, which is input. When the scan switching element SW1 is turned on, the input data signal Vdata may be transferred to the gate terminal of the driving switching element SW2 or one terminal of the storage capacitor Cst.

The storage capacitor Cst may be formed between the gate terminal and the source terminal of the driving switching element SW2, and store a predetermined difference between the level of a data signal transmitted to one terminal of the storage capacitor Cst and the level of the DC power Vdd transferred to the other terminal of the storage capacitor Cst.

For example, when the data signals have different levels according to a Pulse Amplitude Modulation (PAM) method, the level of power stored in the storage capacitor Cst may vary according to a difference in the level of the data signal Vdata.

As another example, when the data signals have different pulse widths according to the Pulse Width Modulation (PWM) method, the level of the power stored in the storage capacitor Cst may vary according to a difference in the pulse width of the data signal Vdata.

The driving switching element SW2 may be turned on according to the level of the power stored in the storage capacitor Cst. When the driving switching element SW2 is turned on, a driving current IDLED, which is proportional to the level of the stored power, flows through the organic light emitting layer OLED. Accordingly, the organic light emitting layer OLED may perform a light emitting operation.

The organic light emitting layer (OLED) includes a light emitting layer (EML) of RGBW corresponding to a sub-pixel, and may include at least one of a hole injection layer (HIL), a hole transport layer (HTL), an electron transport layer (ETL), and an electron injection layer (EIL) and may further include a hole blocking layer.

On the other hand, the sub pixels may emit white light in the organic light emitting layer (OLED) but, in the case of green, red, blue sub-pixels, a separate color filter is provided for realization of color. That is, in the case of green, red, and blue subpixels, green, red, and blue color filters are further provided, respectively. Meanwhile, since a white sub-pixel emits white light, a separate color filter is unnecessary.

On the other hand, although p-type MOSFETs are illustrated as the scan switching element SW1 and the driving switching element SW2 in the drawing, n-type MOSFETs or other switching elements such as JFETs, IGBTs, or SICs may be used.

Figure 7A:
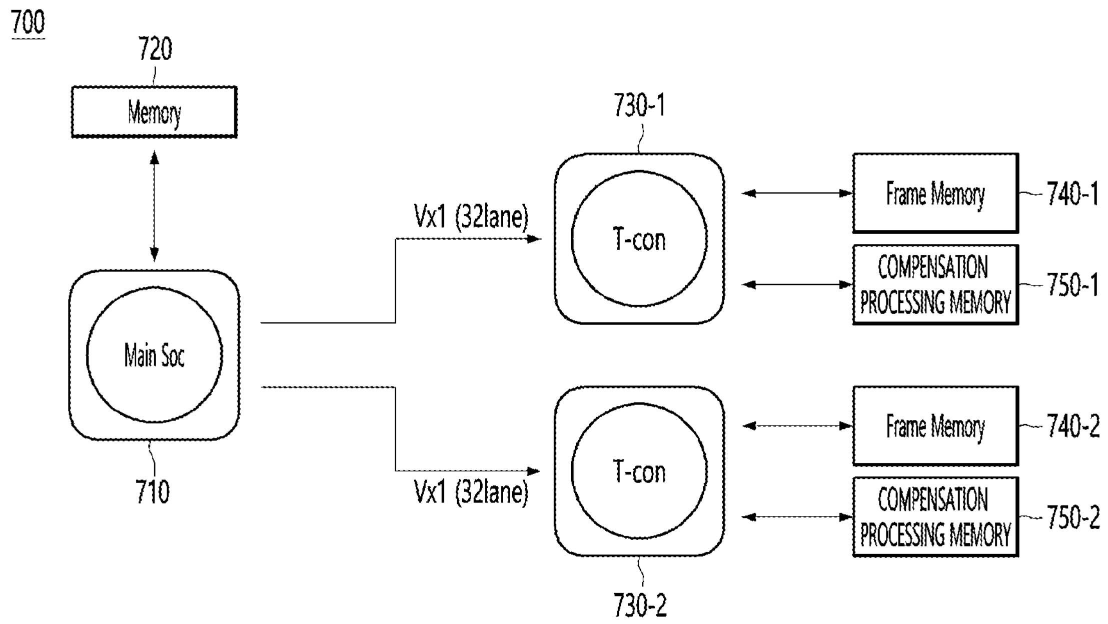
FIG. 7A Prior Art
FIGS. 7A to 7B are diagrams for explaining a procedure of calculating an average picture level (APL) and current of image data using a frame memory for storing image data therein by a conventional OLED display device.
Figure 7B:
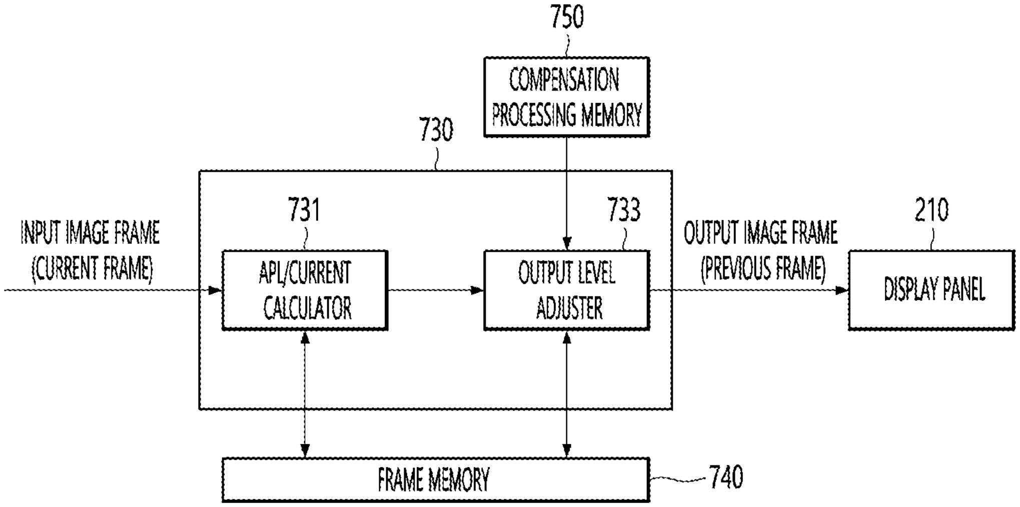
FIG. 7B Prior Art

FIGS. 7A to 7B are diagrams for explaining a procedure of calculating an average picture level (APL) and current of image data using a frame memory for storing image data therein by a conventional OLED display device.

Referring FIG. 7A, the conventional OLED display device 700 may include a main system on chip (Soc) 710, a memory 720, a first timing controller 730-1, a second timing controller 730-2, a first frame memory 740-1, a first compensation processing memory 750-1, a second frame memory 740-2, and a second compensation processing memory 750-2.

The main SoC 710 may control a frame rate of an input image.

The main SoC 710 may control the frame rate of the input image according to an output frequency of a display panel (not shown).

The memory 720 may store image data for one image frame. The image data may be one of RGB data or WRGB data.

The main SoC 710 may communicate with the first timing controller 730-1 and the second timing controller 730-2 through the Vx1 standard.

The main SoC 710 may transfer image data to each of the first timing controller 730-1 and the second timing controller 730-2 through the Vx1 standard.

Each of the first timing controller 730-1 and the second timing controller 730-2 may calculate an APL value of an image frame based on image data received from the main SoC 710.

Each of the first timing controller 730-1 and the second timing controller 730-2 may determine luminance of a display panel, corresponding to an APL value calculated through a peak luminance control (PLC) curve.

Each of the first timing controller 730-1 and the second timing controller 730-2 may determine a current value to be supply to the display panel according to the determined luminance.

Each of the first frame memory 740-1 and the second frame memory 740-2 may store image data for one image frame.

That is, in order for each of the first timing controller 730-1 and the second timing controller 730-2 to calculate an APL value, luminance, and a current value, each of the first frame memory 740-1 and the second frame memory 740-2 may store image data for one image frame.

However, as the resolution of the display panel increases, the processing speed and capacity of image data increases, and accordingly, it may be difficult to implement the first frame memory 740-1 and the second frame memory 740-2 as one chip, and the hardware configuration may be complicated.

The first compensation processing memory 750-1 may store a compensation amount of each of the plurality of pixels, to be transferred to the first timing controller 730-1. The compensation amount of each pixel may be calculated based on a degradation amount of a pixel.

The second compensation processing memory 750-2 may store a compensation amount of each of the plurality of pixels, to be transferred to the second timing controller 730-2. The compensation amount of each pixel may be calculated based on a degradation amount of a pixel.

FIG. 7B is a diagram for explaining an operation of a conventional timing controller.

A timing controller 730 may include an APL/current calculator 731 and an output level adjuster 733.

The APL/current calculator 731 may calculate an APL value of an image frame, a luminance value of a display panel, and a current value to be supplied to the display panel using image data stored in a frame memory 740.

The output level adjuster 733 may determine an output level of an image frame corresponding to the luminance value of the display panel and may apply a compensation level of a pixel, stored in a compensation processing memory 750 to the determined output level to generate final image data.

The compensation processing memory 750 may store a compensation level corresponding to a degradation amount indicating a degree of degradation of each pixel.

The output level adjuster 733 may determine a final output level of the image frame to be output by subtracting or adding the compensation level to the determined output level.

The final output level may be expressed as RGB data or WRGB data.

As such, conventionally, the frame memory 740 may be required to calculate an APL value of an image frame and a current value to be supplied to the display panel.

However, there is a problem in that a chip size increases due to existence of the frame memory 740, and there is a problem in that hardware configuration becomes complicated.

In an embodiment of the present disclosure, an APL of an image frame and current to be supplied to the display panel may be calculated without the configuration of the frame memory 740.

Figure 8:
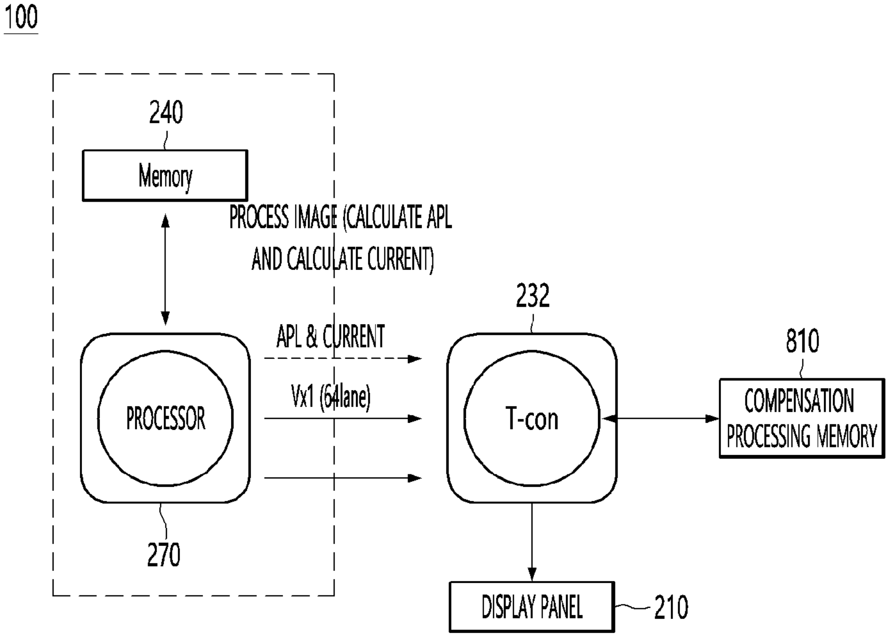
FIG. 8 is a diagram for explaining the configuration of an OLED display device according to an embodiment of the present disclosure.

FIG. 8 is a diagram for explaining the configuration of an OLED display device according to an embodiment of the present disclosure.

Referring to FIG. 8, an OLED display device 100 may include a processor 270, a memory 240, a timing controller 232, a compensation processing memory 810, and a display panel 210.

The processor 270 may acquire image data of an image frame from the memory 240.

The processor 270 may calculate an APL value of the image frame based on the acquired image data.

The processor 270 may transfer the image data and the calculated APL value to the timing controller 232.

The processor 270 may transfer the image data and the APL value to the timing controller 232 through the Vx1 standard.

The memory 240 may store image data in one image frame.

The processor 270 may determine luminance of the display panel 210 and a current value to be supplied to the display panel 210 using the APL value of the image frame.

The processor 270 may transfer the calculated APL value and current value to the timing controller 232.

The timing controller 232 may determine the luminance of display panel 210 based on the APL value received from the processor 270.

The timing controller 232 may adjust the output level of the image data based on the determined luminance and the compensation level read from the compensation processing memory 810.

The timing controller 232 may provide the output image data with the adjusted output level to the display panel 210.

The timing controller 232 may adjust the output level of the image data based on the determined luminance and the compensation level read from the compensation processing memory 810 and may adjust the current value received from the processor 270.

The timing controller 232 may provide the output image data with the adjusted output level and the adjusted current value to the display panel 210.

The compensation processing memory 810 may store a degradation amount of each of pixels configuring the display panel 210 and a compensation level corresponding to the degradation amount.

The display panel 210 may be an RGB-based OLED panel or a WRGB-based OLED panel.

The display panel 210 may output an image according to driving of the timing controller 232.

Figure 9:
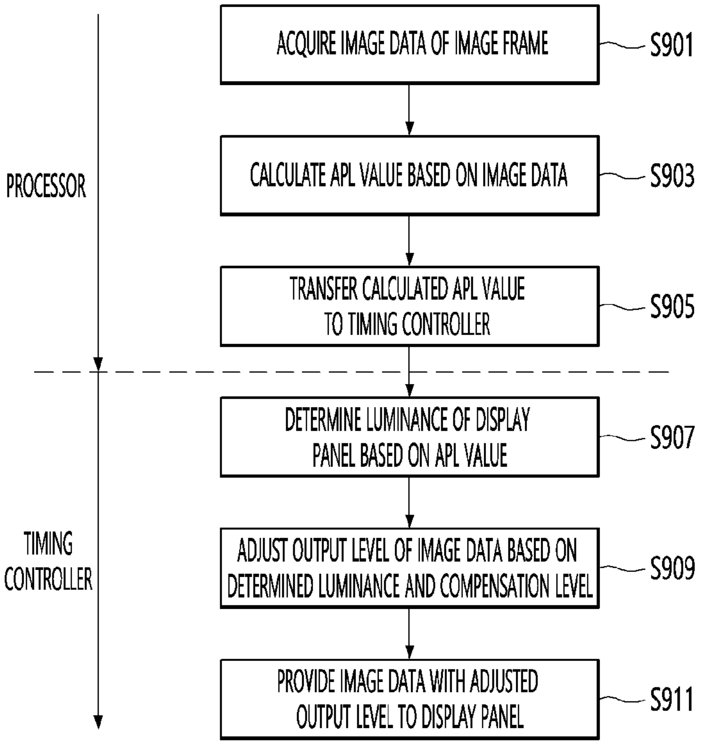
FIG. 9 is a flowchart for explaining an operating method of an OLED display device according to an embodiment of the present disclosure.

FIG. 9 is a flowchart for explaining an operating method of an OLED display device according to an embodiment of the present disclosure.

The processor 270 may acquire the image data of the image frame from the memory 240 (S901).

According to an embodiment, the memory 240 may store image data of one image frame. The memory 240 may store image data of one image frame for frame rate control performed by the processor 270.

According to an embodiment, in the case of an RGB-based OLED display device, image data may include RGB data.

According to another embodiment, in the case of a WRGB-based OLED display device, image data may include WRGB data.

The processor 270 may calculate an APL value of an image frame based on the acquired image data (S903).

When image data is RGB data, the processor 270 may calculate an APL value of a frame using Equation 1 below.

$$APL(\%) = \frac{\text{SUM}\{\text{Max}, (R, G, B)/255\}}{\text{Total number of pixels}} \times 100 \quad \text{[Equation 1]}$$

The processor 270 may transfer the calculated APL value to the timing controller 232 (S905).

The processor 270 may transfer the APL value to the timing controller 232 using the Vx1 standard. The Vx1 standard may be interface standard for transmitting a signal for a flat panel display. The Vx1 standard may be image transmission interface standard for adding a clock signal to image data and transmitting the image data.

The timing controller 232 may determine the luminance of the display panel 210 based on the APL value (S907).

The timing controller 232 may determine the luminance of the display panel 210 using a peak luminance control (PLC) curve.

The PLC curve may be a curve that applies an algorithm for lowering luminance to lower power consumption as the APL value increases.

Pixels of the display panel 210 emits with the maximum luminance or less limited by the PLC curve. The PLC curve may define luminance values according to an APL to increase the maximum luminance of pixels to the peak luminance value at a low APL and to lower the maximum luminance of pixels at a high APL.

According to another embodiment, the processor 270 may determine the luminance of the display panel 210 through the PLC curve based on the APL value and may transfer the APL value and the determined luminance to the timing controller 232.

The processor 270 may store the PLC curve in the memory 240 and may also determine luminance corresponding to the APL value through the PLC curve.

The timing controller 232 may adjust an output level of image data based on the determined luminance and the compensation level read from the compensation processing memory 810 (S909).

In some embodiments, the compensation level may indicate a compensation amount corresponding to a degradation degree of each of a plurality of pixels configuring the display panel 210.

The compensation level may represent a data value to be subtracted from RGB data.

The timing controller 232 may adjust an output level of RGB data by applying a compensation level from RGB data corresponding to the determined luminance.

The timing controller 232 may provide the output image data with the adjusted output level to the display panel 210 (S911).

The timing controller 232 may provide final RGB data with the adjusted output level to the display panel 210.

In more detail, the timing controller 232 may transfer the final RGB data with the adjusted output level to a data driver 236.

As such, according to an embodiment of the present disclosure, unlike the prior art, there is no need for a frame memory to store image data, and thus there is an advantage in cost and the size of a chip may be reduced.

Figure 10:
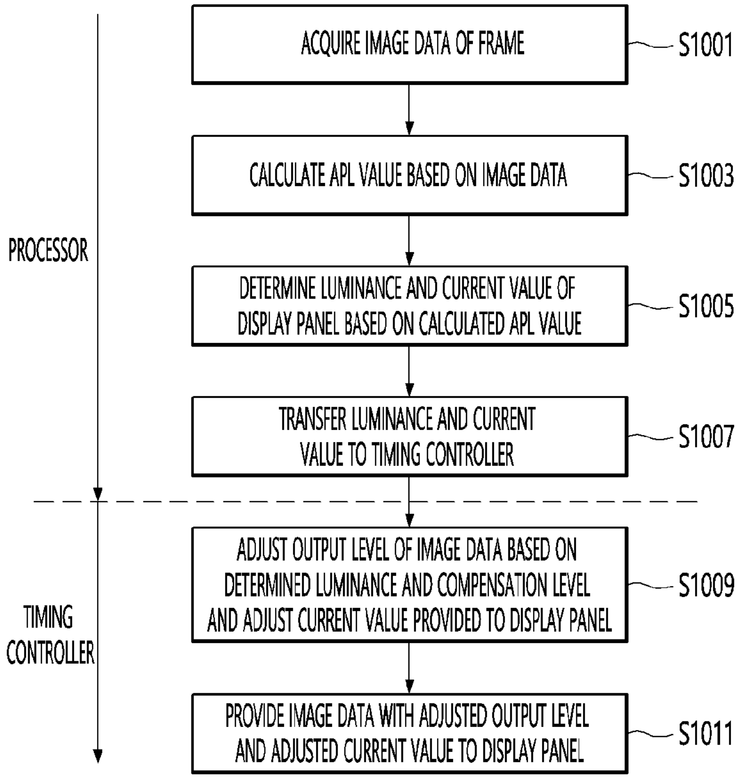
FIG. 10 is a flowchart for explaining an operating method of an OLED display device according to another embodiment of the present disclosure.

FIG. 10 is a flowchart for explaining an operating method of an OLED display device according to another embodiment of the present disclosure.

In particular, FIG. 10 shows an embodiment in which the processor 270 calculates an APL value of image and a current value to be supplied to the display panel 210 and transfers the same to the timing controller 232.

Referring to FIG. 10, the processor 270 may acquire image data of an image frame from the memory 240 (S1001).

According to an embodiment, the memory 240 may store image data of one image frame.

According to an embodiment, in the case of an RGB-based OLED display device, image data may include RGB data.

According to another embodiment, in the case of a WRGB-based OLED display device, image data may include WRGB data.

The processor 270 may calculate an APL value of an image frame based on acquired image data (S1003).

When image data is RGB data, the processor 270 may calculate an APL value of a frame using the aforementioned [Equation 1].

The processor 270 may determine luminance of the display panel 210 and a current value to be supplied to the display panel 210 based on the APL value of the image frame (S1005).

The processor 270 may determine luminance of the APL value through the PLC curve stored in the memory 240 or the processor 270.

The processor 270 may calculate a current value to be supplied to lines or pixels corresponding to the determined luminance.

According to an embodiment, when the display panel 210 includes RGB pixels or WRGB pixels, the processor 270 may calculate a current value to be supplied to the display panel 210.

According to another embodiment, only when the display panel 210 includes WRGB pixels, the processor 270 may calculate a current value to be provided to the display panel 210. This is to limit MAX current provided to the WRGB pixel.

The processor 270 may transfer the calculated APL value and current value to the timing controller 232 (S1007).

The processor 270 may transfer the APL value and the current value to the timing controller 232 using the Vx1 standard. The Vx1 standard may be interface standard for transmitting a signal for a flat panel display. The Vx1 standard may be image transmission interface standard for adding a clock signal to image data and transmitting the image data.

The timing controller 232 may adjust an output level of image data based on the determined luminance and a compensation level read from the compensation processing memory 810 and may adjust the current value received from the processor 270 (S1009).

According to an embodiment, the compensation level may indicate a compensation amount corresponding to a degradation degree of each of a plurality of pixels configuring the display panel 210.

The compensation level may represent a data value to be subtracted from RGB data.

The timing controller 232 may adjust an output level of RGB data by applying a compensation level from RGB data corresponding to the determined luminance.

The timing controller 232 may determine whether the current value received from the processor 270 is greater than a preset current value (MAX current value).

When the current value received from the processor 270 is greater than a preset current value (MAX current value), the timing controller 232 may adjust the current value to be equal to or less than the preset current value.

When the current value received from the processor 270 is not greater than a preset current value (MAX current value), the timing controller 232 may not adjust the current value. That is, a procedure of adjusting the current value may be optional.

The timing controller 232 may provide output image data with the adjusted output level and the adjusted current value to the display panel 210 (S1011).

The timing controller 232 may provide final RGB data with the adjusted output level to the display panel 210.

In more detail, the timing controller 232 may transfer the final RGB data with the adjusted output level to the data driver 236.

The timing controller 232 may provide the adjusted current value to the display panel 210.

As such, according to an embodiment of the present disclosure, unlike the prior art, there is no need for a frame memory to store image data, and thus there is an advantage in cost and the size of a chip may be reduced.

Figure 11:
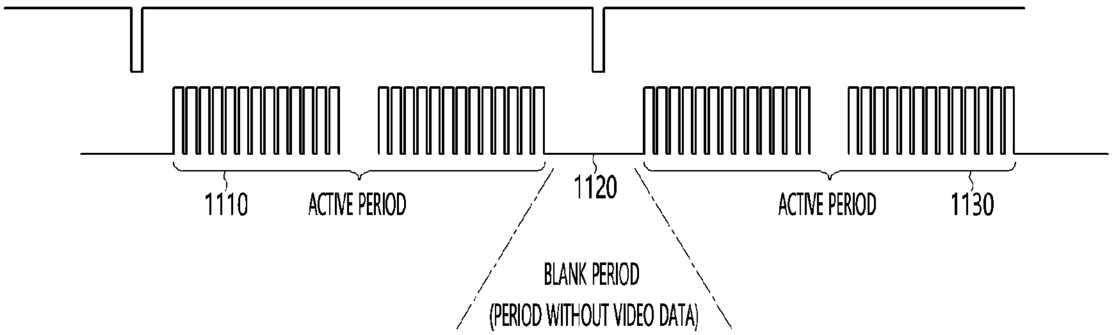
FIG. 11 is a diagram for explaining a procedure in which a processor transfers an APL value or an APL value and a current value to a timing controller via the Vx1 standard according to an embodiment of the present disclosure.

FIG. 11 is a diagram for explaining a procedure in which a processor transfers an APL value or an APL value and a current value to a timing controller via the Vx1 standard according to an embodiment of the present disclosure.

FIG. 11 shows an active period 1110 of a previous image frame, a blank period 1120, and an active period 1130 of a current image frame, transferred to the timing controller 232 by the processor 270 via Vx1 standard.

The active period 1110 of the previous image frame may be a period including image data of the previous image frame.

The active period 1130 of the current image frame may be a period including image data of the current image frame.

The blank period 1120 may be present between the active period 1110 of the previous image frame and the active period 1130 of the current image frame. The blank period 1120 may be a period without image data.

According to an embodiment of the present disclosure, the processor 270 may insert the APL value of the current image frame in the blank period 1120 and may transfer the APL value to the timing controller 232.

The processor 270 may calculate the APL value based on image data of the current image frame stored in the memory 240, may insert the calculated APL value in the blank period 1120 before the active period 1130 of the current image frame, and may transfer the APL value to the timing controller 232.

According to another embodiment of the present disclosure, the processor 270 may insert the APL value and luminance value of the current image frame and the current value supplied to the display panel 210 in the blank period 1120 and may transfer the same to the timing controller 232.

The processor 270 may calculate the APL value based on image data of the current image frame stored in the memory 240 and may calculate luminance using the calculated APL value.

The processor 270 may calculate the current value to be supplied to the display panel 210, corresponding to the calculated luminance, may insert the APL value, the luminance, and the current value in the blank period 1120 before the active period 1130 of the current image frame, and may transfer the same to the timing controller 232.

As such, according to an embodiment of the present disclosure, the processor 270 may transfer the APL value, the luminance, and the current value to the timing controller 232 without an additional interface. Thus, efficiency may be increased in terms of cost or processing speed due to an additional interface.

According to an embodiment of the present disclosure, as a frame memory is removed, a chip size may be reduced and the cost may be reduced.

According to an embodiment of the present disclosure, when data such as APL value is transmitted, no additional interface may be required, and thus the existing Vx1 standard may be efficiently used.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The display device described above is not limited to the configuration and method of the above-described embodiments, and the above embodiments may be configured by selectively combining all or some of embodiments such that various modifications may be made.

What is claimed is:

1. A display device comprising:

a display; and a controller configured to control the display to display image data, wherein the display comprises:

a display panel;

a timing controller configured to control an operation of the display panel;

a memory configured to store image data of an image frame; and a processor configured to:

calculate an average picture level (APL) value using the image data stored in the memory, and transfer the calculated APL value and the image data to the timing controller, wherein the memory is connected to the processor and is not connected to the timing controller, and wherein the processor is configured to insert the APL value in a blank period present between an active period of the image frame and an active period of a previous image frame and transfer the APL value to the timing controller.

2. The display device of claim 1, wherein the processor is configured to calculate luminance of the display panel using the calculated APL value and transfer the APL value and the calculated luminance to the timing controller.

3. The display device of claim 2, wherein the processor is configured to calculate a current value supplied to the display panel using the calculated luminance and transfer the calculated current value to the timing controller.

4. The display device of claim 1, wherein the processor is configured to transfer the APL value to the timing controller through Vx1 standard.

5. The display device of claim 1, wherein the timing controller is configured to calculate luminance of the display panel using the calculated APL value.

6. The display device of claim 5, further comprising:

a compensation processing memory configured to store a compensation level for each of a plurality of pixels configuring the display panel, wherein the timing controller is configured to adjust an output level of the image data based on determined luminance and the compensation level and transfer final image data with the adjusted output level to the display panel.

7. An operating method of a display included in a display device, the method comprising:

storing image data of an image frame, by a memory;

calculating an average picture level (APL) value using the image data stored in the memory, by a processor; and transferring the calculated APL value to a timing controller configured to control driving of a display panel, by the processor, wherein the memory is connected to the processor and is not connected to the timing controller, wherein the transferring the APL value includes inserting the APL value in a blank period present between an active period of the image frame and an active period of a previous image frame and transferring the APL value to the timing controller.

8. The method of claim 7, further comprising:

calculating luminance of the display panel using the calculated APL value; and transferring the calculated luminance to the timing controller.

9. The method of claim 8, further comprising:

calculating a current value supplied to the display panel using the calculated luminance; and transferring the calculated current value to the timing controller.

10. The method of claim 7, wherein the transferring the APL value includes transferring the APL value to the timing controller through Vx1 standard.

11. The method of claim 7, further comprising:

calculating luminance of the display panel using the calculated APL value.

12. The method of claim 11, further comprising:

storing a compensation level for each of a plurality of pixels configuring the display panel;

adjusting an output level of the image data based on determined luminance and the compensation level; and transferring final image data with the adjusted output level to the display panel.

* * * * *